United States Patent [19]

Kovacs et al.

[11] Patent Number: 5,272,047
[45] Date of Patent: Dec. 21, 1993

[54] OPTICAL INFORMATION RECORDING MEDIUM USING AZO DYES

[75] Inventors: Csaba A. Kovacs; Derek D. Chapman, both of Rochester, N.Y.

[73] Assignee: Eastman Kodak Company, Rochester, N.Y.

[21] Appl. No.: 904,615

[22] Filed: Jun. 26, 1992

[51] Int. Cl.⁵ .............................................. G11B 7/24
[52] U.S. Cl. .................... 430/495; 430/945; 430/944; 430/275; 346/135.1
[58] Field of Search .............. 430/495, 945, 964, 944, 430/341, 275; 369/288; 534/698, 707; 346/135.1

[56] References Cited

U.S. PATENT DOCUMENTS

| | | | |
|---|---|---|---|
| 4,204,993 | 5/1980 | Chapman | 430/188 |
| 4,465,767 | 8/1984 | Oba et al. | 430/271 |
| 4,521,506 | 6/1985 | Solzenburg et al. | 430/241 |
| 4,598,030 | 7/1986 | Reczek | 430/17 |
| 4,686,143 | 8/1987 | Yoshikawa et al. | 428/411.1 |
| 4,824,485 | 4/1989 | Tanaka et al. | 106/22 |
| 4,940,618 | 7/1990 | Hamada et al. | 428/64 |
| 5,075,147 | 12/1991 | Usami et al. | 428/64 |
| 5,090,009 | 2/1992 | Hamada et al. | 369/284 |

FOREIGN PATENT DOCUMENTS

| | | |
|---|---|---|
| 2005520 | 6/1990 | Canada . |
| 63-081165 | 4/1988 | Japan . |
| 3-051182 | 3/1991 | Japan . |
| 3-268994 | 11/1991 | Japan . |

*Primary Examiner*—Charles L. Bowers, Jr.
*Assistant Examiner*—John A. McPherson
*Attorney, Agent, or Firm*—John R. Everett

[57] ABSTRACT

There is disclosed a recordable optical element that includes a metallized dye. The element has a transparent substrate and on the surface of the substrate, a dye containing recording layer and a light reflecting layer. The improvement is that the dye is a metal complex of a tridentate azo dye ligand containing, on one side of the azo linkage, an aminohydroxypyridine group and on the other side, an aromatic ring including an electron withdrawing substituent. The dyes that are used in the element are very light stable.

21 Claims, No Drawings

OPTICAL INFORMATION RECORDING MEDIUM USING AZO DYES

FIELD OF THE INVENTION

The present invention relates to optical recording materials. The materials are particularly useful in making recordable compact disks.

BACKGROUND OF THE INVENTION

There are many types of optical recording materials that are known. In many of the materials, the mode of operation requires that the unrecorded material have a high absorption and that the recorded areas, often referred to as pits, have low optical density or high reflection. The high reflection pits are made by ablating away the high absorption recording material, usually exposing an underlying reflective support.

One of the currently popular forms of optical storage of information is the compact disk or CD. Digital information is stored in the form of high optical density marks or pits on an otherwise reflective background, the exact opposite of the above described optical recording materials. In this format, the optical information is most often in the form of read only memory or ROM. Optical information is not usually recorded in real time but rather is produced by press molding. In a typical process, the optical recording substrate is first press molded with a master containing the digital information to be reproduced. The thus formed information is then overcoated with a reflective layer and then with an optional protective layer. In those areas having the deformations or pits, the optical density is higher than in those areas not having the deformations.

It is desirable to produce optical recording media which, when recorded in real time, produces a record that mimics the conventional CD on read out. In this manner, information can be added to the CD and the CD can be used on a conventional CD player.

One recently disclosed system of this type is the so called "Photo CD". In this system, conventional photographic film is first processed in a conventional manner. Then, the images from the film are digitized and the digital information is recorded in a CD readable form on an optical recording material. Images can then be played back on a CD type player into a conventional television. Since a CD has a capacity for a number of digitized images that is greater than the typical roll of consumer film, it is anticipated that the user will want to add images to a preexisting CD. Thus the need for recordable, CD compatible optical recording material.

One method for forming a recordable element that mimics conventional mold pressed CD elements is to provide a heat deformable support having thereon, in order, a layer of a dye that absorbs recording radiation and a reflective layer. Exposure of the recording layer through the support by the recording beam heats the recording layer to an extent that it is said that the surface of the heat deformable support just adjacent to the recording layer surface is deformed. Materials of this type are described in U.S. Pat. No. 4,940,618, European Patent Application 0,353,393 and Canadian Patent Application 2,005,520.

Commercially useful materials of the type described in these references have stringent requirements. One of these requirements is light stability. Since the Photo CD is a consumer product, it must be capable of withstanding extreme environments. Between the time the original images are recorded on the Photo CD and the time subsequent images are recorded, the CD might be placed in strong sunlight, for example. The recording layer must be very light stable for this purpose.

In the U.S. patent and European application mentioned above, the preferred dyes for the recording layer are indodicarbocyanine dyes. However, this type of dye has less than the desired light stability and will in fact fade to an unusable state in only a few days of intense sunlight.

In U.S. Pat. No. 4,686,143, there is disclosed an optical information recording medium, not of the characteristic CD structure. However, the patent does disclose the use of certain monoazo dyes, different from the dyes useful in the present invention. The specific dyes disclosed, for example at cols 3-8 of that patent, would not be useful for CD recording either because of undesirable optical characteristics or because of poor light stability or both.

Thus, there is a continuing need for optical recording materials that have the necessary optical characteristics so that they are CD compatible and yet are light stable. It is to a solution to this problem that the present invention is directed.

SUMMARY OF THE INVENTION

In accordance with the present invention there is provided a recordable optical element having a transparent substrate and on the surface of said substrate, a dye containing recording layer and a light reflecting layer, the improvement wherein said dye is a metal complex of a tridentate azo dye ligand containing, on one side of the azo linkage, an aminohydroxypyridine group and on the other side, an aromatic ring including an electron withdrawing substituent.

The recordable elements of the present invention have optical properties such that they are CD compatible and have excellent light stability.

DETAILED DESCRIPTION OF THE INVENTION

In accordance with preferred aspects of the invention, the metal complex of the tridentate azo dye ligand has a structural formula represented by A, B, C or D below. Mixtures of the described dyes are also useful.

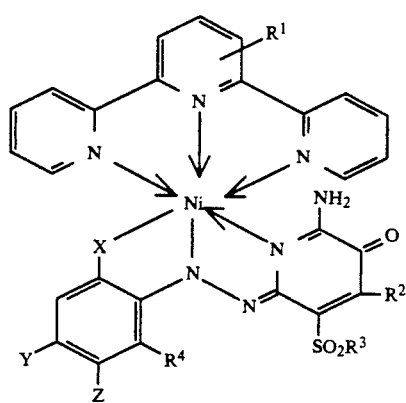

Structure A wherein $R^1$ represents a substituted or unsubstituted alkyl group of from 1 to about 10 carbon atoms; an aryl group of from about 6 to about 10 carbon atoms; a heteroaryl group of from about 5 to about 10 carbon atoms; an acyl group; an alkyl or aryl sulfonyl group; an aminocarbonyl group; an alkylthio group; an arylthio group or alkoxy group containing from 1 to about 15 carbon atoms or an aryloxy group containing from 6 to about 15 carbon atoms;

$R^2$ represents hydrogen or an alkyl group of from 1 to about 6 carbon atoms;

$R^3$ represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or $NR^5R^6$ where $R^5$ and $R^6$ each independently represent hydrogen; an alkyl group of from 1 to about 5 carbon atoms; an aryl group of from about 6 to about 10 carbon atoms; a heteroaryl group of from about 5 to about 10 carbon atoms; or a cycloalkyl group of from about 5 to about 7 carbon atoms; or may be taken together to form a carbocyclic or heterocyclic ring having from about 5 to about 7 atoms;

$R^4$ represents hydrogen; an alkyl group of from 1 to about 4 carbon atoms; or a halogen atom;

X represents oxygen, carboxyl group or $NSO_2R^7$ where $R^7$ is an alkyl group of from 1 to about 4 carbon atoms; an aryl group of from about 6 to 10 carbon atoms or a hetaryl group of from about 5 to about 10 carbon atoms;

Y represents an electron withdrawing group such as $NO_2$, CN, $SO_2R^8$, $SO_2NR^9R^{10}$ where $R^8$, $R^9$ or $R^{10}$ each independently can represent a hydrogen; an alkyl group of from 1 to about 5 carbon atoms; an aryl group of from about 6 to about 10 carbon atoms; a hetaryl group of from about 5 to about 10 carbon atoms; or a cycloalkyl group of from about 5 to about 7 carbon atoms; $R^9$ and $R^{10}$ may be taken together for form a carbocyclic or heterocyclic ring having from about 5 to about 7 atoms; except that $R^8$ can not be hydrogen.

Z represents cyano, a halogen, an alkyl, or an alkoxy group of from 1 to about 10 carbon atoms.

The metal may be Ni, Cu, Zn, Al or any other metal that fulfills the valence and orbital requirements.

Another general structure B is shown below in which the tridentate colorless terpyridine ligand is replaced by a ligand of the diethylenetriamine type. Also monodentate ligands such as pyridine, substituted pyridine and water may be employed, as is shown in structure C.

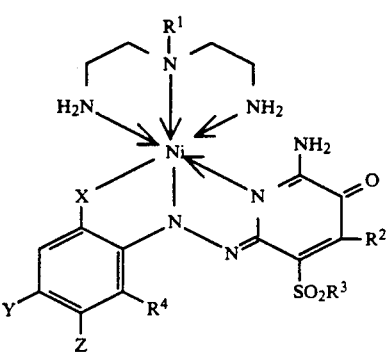

Structure B

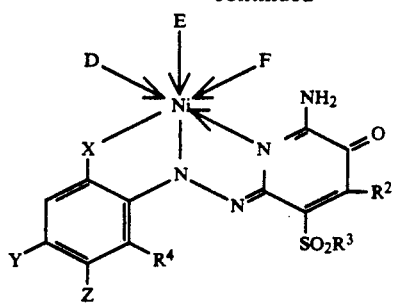

Structure C

In structure C, D, F and E are complexing agents such as $H_2O$, pyridine or substituted pyridines. D,F and E may be the same or different with the proviso that only one pyridine can be present.

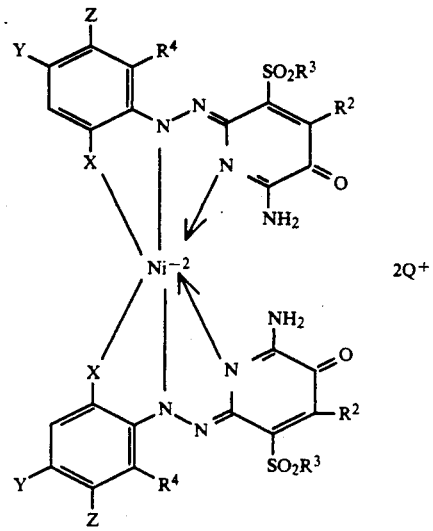

Structure D

In structure D, Q is an cation so as to balance the charge of the molecule. The nature of the cation is not critical and can be any conventional cation such as sodium or potassium. For improved solubility, complex cations such as tetrabutyl ammonium are preferred.

In the descriptions above, alkyl can be a straight or branched chain group such as methyl, ethyl or isopropyl. The cycloalkyl group can be, for example cyclohexyl or cyclopentyl. The alkoxy group can be, for example, ethoxy or butoxy. The aryl group can be, for example, phenyl, aminophenyl or propioaminophenyl. The heteroaryl group can be, for example, 2-pyridyl or 2-furyl.

Dyes of Structure A are the currently preferred dyes since they are more organic solvent soluble and therefore easier to coat. They also have improved tendency to stay in the amorphous state after coating. Particularly preferred dyes are A-9, A-13 and D-2 identified below. These dyes have desirable indices of refraction and have excellent recording sensitivity.

Particular dyes which are useful in the invention include:

Dye A-1
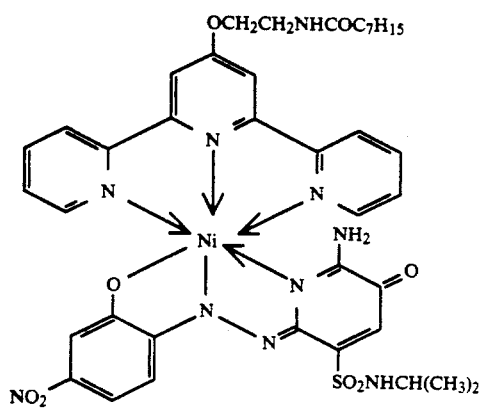
Dye A-5
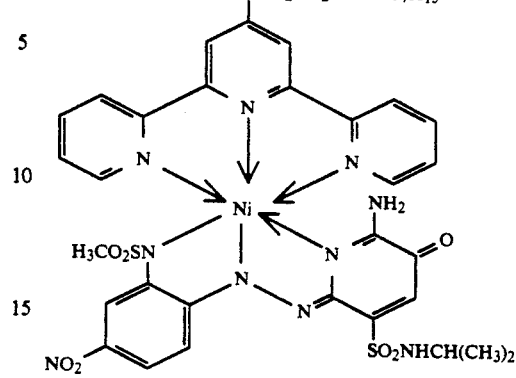
Dye A-2
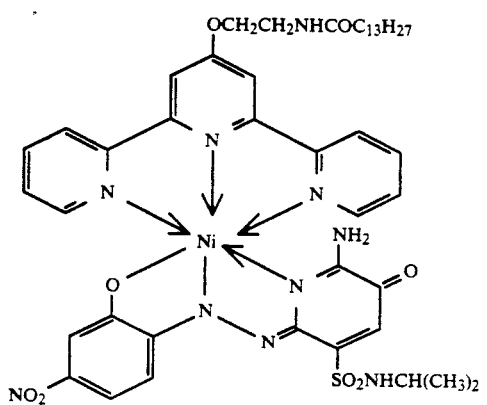
Dye A-6
Dye A-3
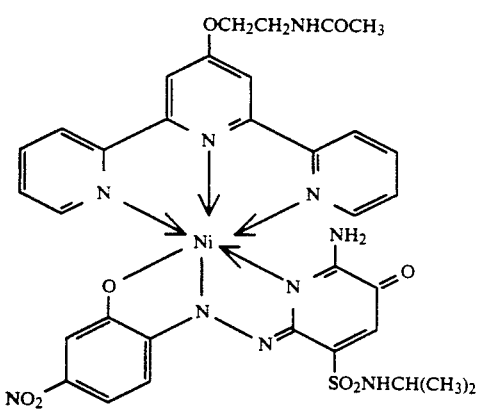
Dye A-7
Dye A-4
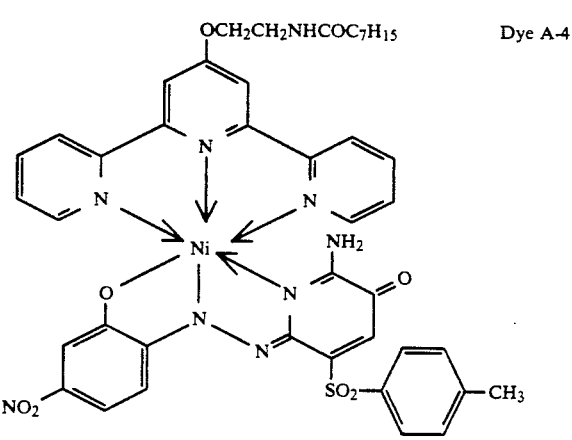
Dye A-8
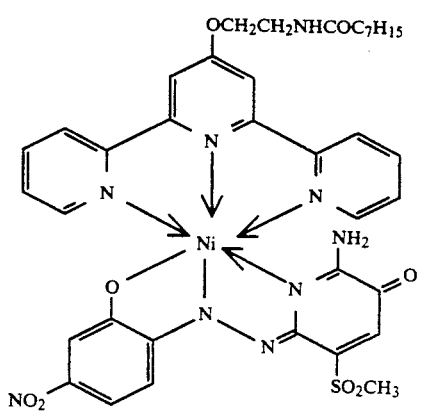

-continued
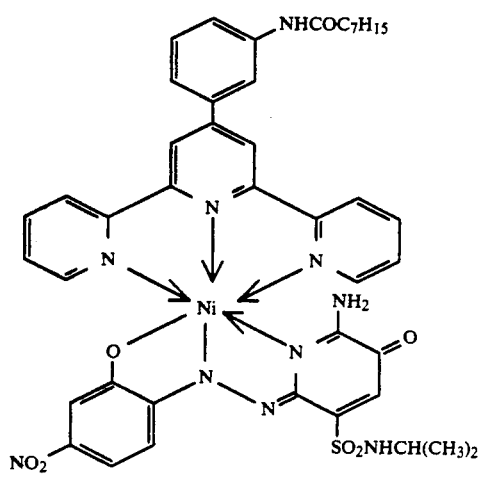
Dye A-9
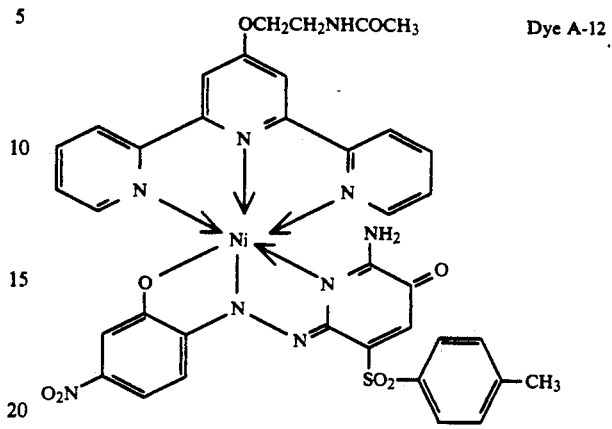
Dye A-12
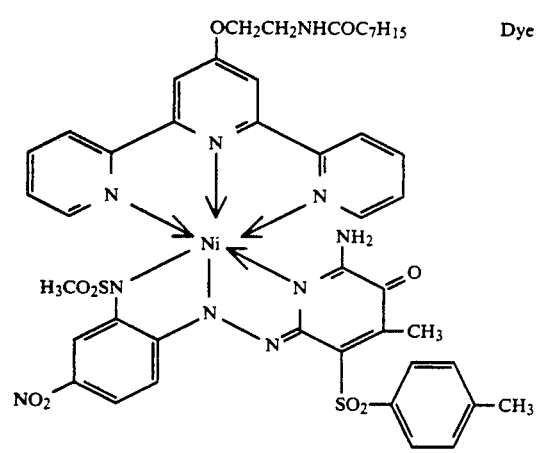
Dye A-10
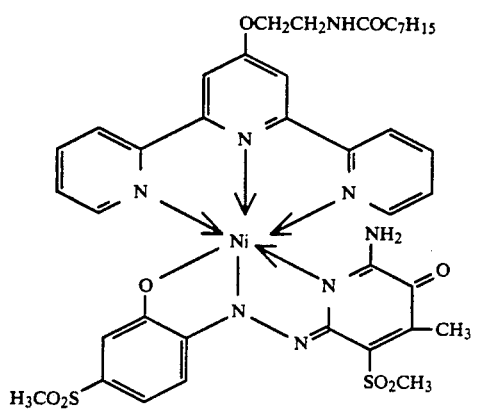
Dye A-11
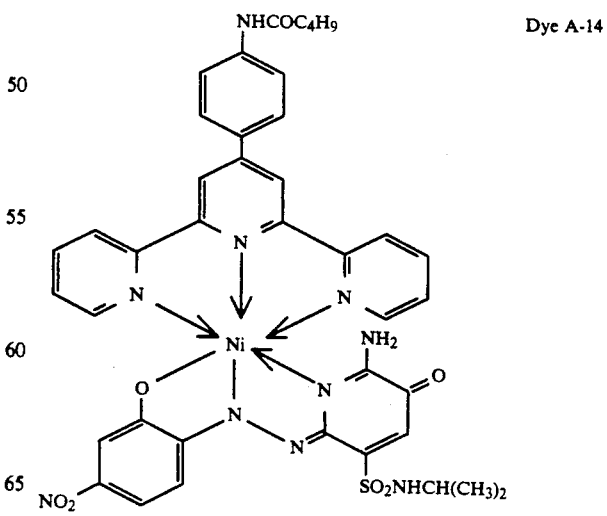
Dye A-13
Dye A-14

-continued
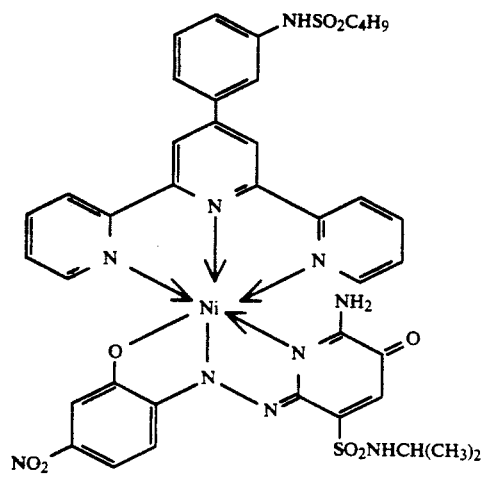
Dye A-15
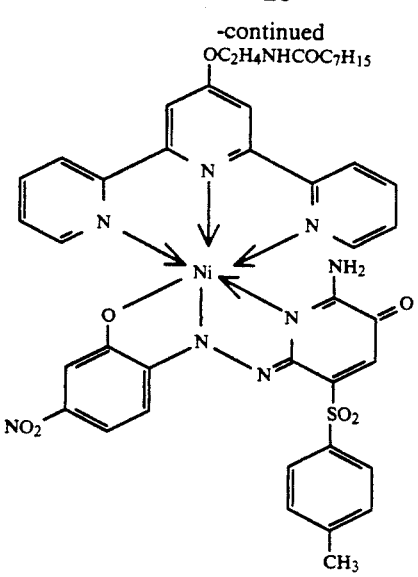
Dye A-18
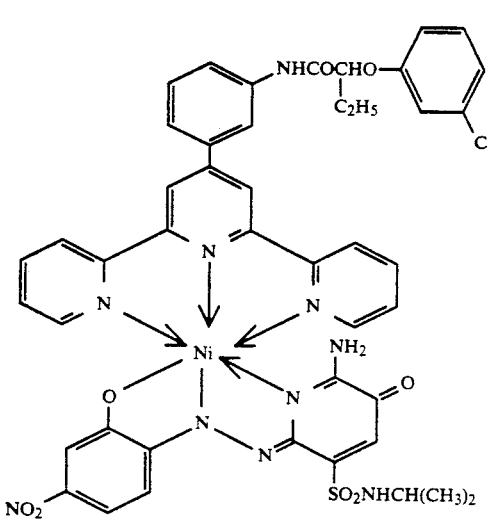
Dye A-16
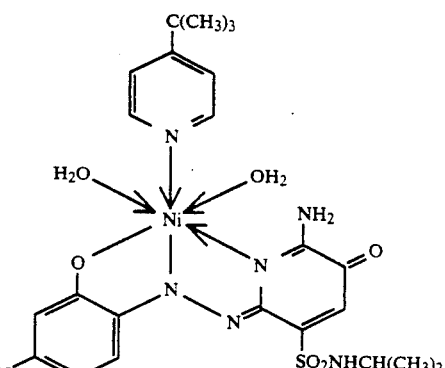
Dye C-1
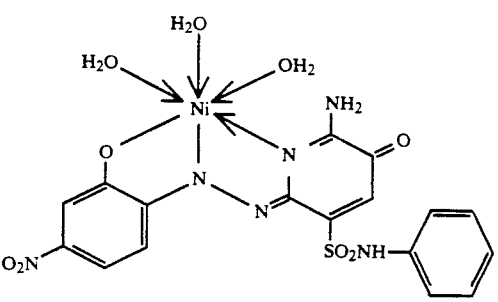
Dye C-2
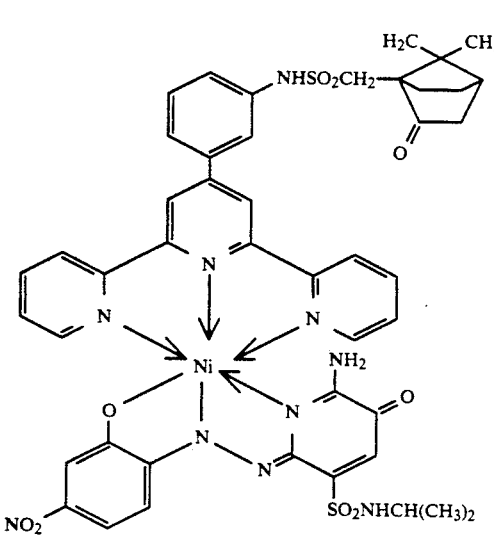
Dye A-17
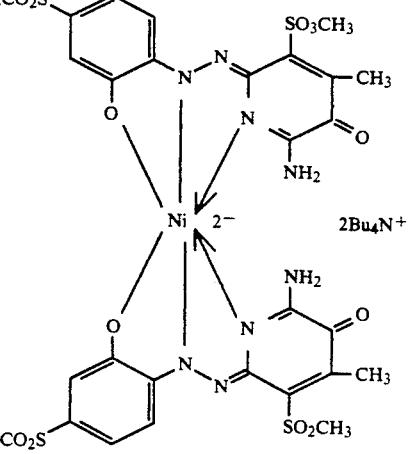
Dye D-1

-continued

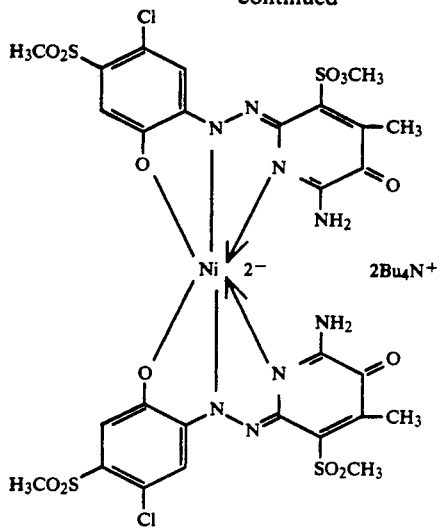

Dye D-2

The elements of the invention use dyes which are metallized azo dyes. The optical information recording medium comprises a light transmitting, typically pregrooved substrate, the metallized azo dye light absorptive layer overlaying the substrate, a light reflective layer overlaying the light absorptive layer and a protective layer overlaying the light reflective layer. The recording process will produce marks of lower reflectivity than the unmarked areas of the disk when written and read with a diode laser emitting between 770 and 800 nm. It is preferred that the real part of the complex refractive index (N) of the unwritten light absorptive layer measured with 780 nm light source is not less than 1.8 and the imaginary part (k) is not greater than 0.15.

The substrate may be any transparent material that satisfies the mechanical and optical requirements. Generally pregrooved with groove depths from 20 nm to 250 nm, groove widths 0.2 to 1 μm and a pitch 1 to 2 μm. The preferred material is polycarbonate, other materials are glass, polymethylmethacrylate and other suitable polymeric materials.

The preparation of the optical recording element of the invention is achieved by spin coating of the metallized azo dye by itself, or with other dye or dyes or with addenda, from a suitable solvent onto a transparent substrate. For coating, the metallized azo dye with or without addenda is dissolved in a suitable solvent so that the dye is 20 or less parts by weight to 100 parts of solvent by volume. The dye recording layer of the element is then overcoated with a metal reflective layer under reduced pressure by resistive heating or a sputter method and finally overcoated with a protective resin.

Coating solvents for the dye recording layer are selected to minimize their effect on the substrate. Useful solvents include as alcohols, ethers, hydrocarbons, hydrocarbon halides, cellosolves, ketones. Examples of solvents are methanol, ethanol, propanol, pentanol, 2,2,3,3-tetrafluoropropanol, tetrachloroethane, dichloromethane, diethyl ether, dipropyl ether, dibutyl ether, methyl cellosolve, ethyl cellosolve, 1-methyl-2-propanol, methy ethyl ketone, 4-hydroxy-4-methyl-2-pentanone, hexane, cyclohexane, ethylcyclohexane, octane, benzene, toluene, and xylene. Other less desirable solvents include water and dimethylsulfoxide. Preferred solvents are hydrocarbon solvents and alcohol solvents since they have the least effect on the preferred polycarbonate substrates. Mixtures of solvents can also be used.

Useful addenda for the recording layer include stabilizers, surfactants, binders and diluents.

The reflective layer can be any of the metals conventional used for optical recording materials. Useful metals can be vacuum evaporated or sputtered and include gold, silver, aluminium and copper and alloys thereof.

The protective layer over the reflective layer is similarly conventional for this art. Useful materials include UV cureable acrylates.

One preferred protective layer is disclosed in commonly assigned U.S. patent application Ser. No. 15,020, filed Dec. 27, 1991 in the names of Kosinski and Amell. This application discloses a two layer structure in which the layer adjacent to the reflective layer is spin coated and the a second layer is screen printed.

An intermediate layer, to protect the metal layer from oxidation, can also be present.

The element of the invention can have prerecored ROM areas as described in U.S. Pat. No. 4,940,618. The surface of the substrate can have a separate heat deformable layer as described in U.S. Pat. No. 4,990,388. Other patents relating to recordable CD type elements are U.S. Pat. Nos. 5,009,818; 5,080,946; 5,090,009; 4,577,291; 5,075,147; and 5,079,135.

The following preparatory examples illustrate the preparation of the dyes used in the invention.

PREPARATORY EXAMPLES

I. 4-Methylthio-2.6-di(2-pyridyl)pyridine

This compound was prepared by the method described by Potts et al J. Org. Chem., 47, 3078 (1982).

II. 4-Methanesulfonyl-2,6-di(2-pyridyl)pyridine

The above methylthio compound (25 g) was suspended in methanol (500 ml) containing acetic acid (75 ml) and sodium acetate (40 g). Sunny Sol TM bleach (325 g containing 4.99% available chlorine by weight) was added dropwise with stirring over 90 minutes. The color of the reaction mixture changed from dark brown to pale yellow. The temperature was kept below 20° C. by cooling. At the end of the addition the mixture was diluted with water to 2 liters and filtered. The crude product was slurried with ethanol (250 ml) to dissolve impurities and filtered. The yield of material melting at 205°-7° C. was 18.2 g.

III. 4-(2-Aminoethoxy)-2,6-di(2-pyridyl)pyridine

Ethanolamine (8.9 g) that had been dried over molecular sieves was added to THF (500 ml) that had been dried by distillation from lithium aluminum hydride. Potassium t-butoxide (13.5 g) was then added and the solution allowed to stir at room temperature for 20 minutes. The methanesulfonylterpyridine (25 g) was added and the solution stirred at room temperature for 4 hours. The THF solution was filtered to remove potassium methanesulfinate and the filtrate concentrated to dryness. After recrystallization from acetonitrile the yield of product melting at 134°-7° C. was 18.4 g.

IV. 4-(2-Octanamidoethoxy)2,6-di(2-pyridyl)pyridine

The above aminoethoxyterpyridine compound (20 g) was dissolved in THF (400 ml) and triethylamine (6.8 g) added. Octanoyl chloride (11.2 g) dissolved in THF (25 ml) was added dropwise to the cooled solution. The reaction mixture was allowed to warm to room temperature and stirred for 2 hours. Some of the THF was removed by distillation and the residue diluted with ice water. The precipitate was filtered off and dried in a vacuum oven at room temperature. The product was used without further purification. Yield 28 g.

V.
2-Amino-3-hydroxy-5-isopropylsulfamoyl-6-(2-mesyloxy-4-nitrophenylazo)pyridine Sodium nitrite (3.6 g) was dissolved in concentrated sulfuric acid (25 ml) with slight warming. After cooling the solution was diluted with a mixture of acetic and propionic acids (5/1 50 ml). 2-Mesyloxy- 4-nitroaniline (11.6 g) was added portionwise with vigorous stirring. After 2 hours another portion of 5/1 acid was added and the diazonium solution kept at 5° C. while a solution of 2-amino-3-hydroxy-5-isopropylsulfamoylpyridine (11.5 g) in aqueous acetic acid (1/1 500 ml) containing sodium acetate (100 g) was being prepared. The diazonium solution was slowly added to the coupler solution at 5° C. and the reaction mixture stirred for 1 hour and then diluted with water. The dye was filtered off washed with a large volume of water and dried in a vacuum oven. Yield 26.8 g of the desired material and some inorganic salts.

VI.
2-Amino-3-hydroxy-5-isopropylsulfamoyl-6-(2-hydroxy-4-nitrophenylazo)pyradine The above dye (28 g) was placed in a solution of sodium hydroxide (10 g) in water (100 ml) and ethanol (200 ml) and the mixture stirred at room temperature for 2 hours. At the end of this time the solution was acidified with acetic acid and the product removed by filtration. The yield of crude dye was 16 g after being dried in a vacuum oven. An analytical sample was obtained by recrystallization from acetic acid.

VII. Nickel complex of 2-Amino-3-hydroxy-5-isopropylsulfamoyl6-(2-hydroxy-4-nitrophenylazo)pyridine The dye (11.5 g) was dissolved in DMF (50 ml) and nickel acetate (8 g) added. The solution was stirred for 3 hours and then diluted with water. The precipitated complex was filtered off washed with water and oven dried. The yield was 14.3 g.

VIII. Compound of Formula A where $R^1$=2-Octanamidoethoxy: $R^2$=$R^4$=Hydrogen: $R^3$=NHisopropyl and X=oxygen The nickel complex (14.3 g) and the octanamidoethoxy terpyridine (11.8 g) were added to DMF (200 ml) and the solution stirred for 12 hours. Methanol was added and the precipitate filtered off. Yield 17 g. Purification was effected by suspending the material in ethanol (200 ml), heating to boiling and filtering hot. A further 5 g of product was obtained from the DMF filtrate by dilution with water. This is refered to as Dye A-1 as indicated above.

The following examples are presented for a further understanding of the invention.

Example 1 with Dye A-1

A polycarbonate disc substrate having a thickness of 1.2 mm, an outer diameter of 120 mm and an inner diameter of 15 mm and having a spiral pregrooved formed on its surface with a width of 0.4 μm, and a depth of 0.08 μm and a pitch of 1.6 μm, was made by injection molding.

To form the light absorptive layer 1 part by weight of dye A-1 was dissolved in 40 parts of 2,2,3,3-tetrafluoropropanol by volume with stirring at room temperature for 1 hour. Then the solution was filtered through a 0.2 μm filter. The solution was coated on the surface of the substrate by spin coating to a optical density of 0.75 at 700 nm. It was dried at 80° C. for 15 minutes.

Then a gold reflective layer was deposited on the entire surface of the disc by resistive heating to a 1200 A thickness.

To protect the gold layer a lacquer (Daicure SD-17) was applied by spin coating onto the gold layer to a thickness of 7 to 11 μm and it was UV cured with an 'H' bulb using a fusion system cure at 3000 W/inch power for 15 seconds.

To test the optical disc thus obtained, a test system consisting of an optical head with a 785 nm laser, a 0.5 NA lens, phase tracking, and ¼ aperture focusing was used. The optics used circularly polarized light to reduce laser feedback effects. Read power was kept at 0.6 mW. Recording and play back was carried out at 5.6 m/s. Single frequency was recorded with a 1.5 micron mark length at 12 mW write power, through 30 Kz filter, forming marks of lower reflectivity than the unmarked area when examined with a light source emitting between 770 nm and 800 nm light. When the marks were read with the write laser CNR (Fundamental of the playback signal to noise) was

Example 2 with Dye C-2

A polycarbonate disc substrate having a thickness of 1.2 mm an outer diameter of 120 mm and an inner diameter of 15 mm and having a spiral pregrooved formed on its surface with a width of 0.4 μm, and a depth of 0.1 μm and a pitch of 1.6 μm, was made by injection molding.

To form the light absorptive layer 1 part by weight of dye C-2 was dissolved in 25 parts of 2-methoxy-1-ethanol by volume to this solution 26 parts of a saturated solution of nickelous acetate by volume was added. The solution was stirred at room temperature for 1 hour. Then the solution was filtered through a 0.2 μm filter. The dye was coated on the surface of a substrate by spin coating to an optical density of 1.6 at 670 nm. It was dried at 80° C. for 15 minutes.

Then a gold reflective layer was deposited by resistive heating on the entire surface of the disc to a 1200 A thickness.

To test the disc the same procedure as in example was used the CNR was found to be 55 dB at 22 mW write power.

Example 3 with Dye A-3

The same disk substrate was used as in the first example.

To form the light absorptive layer 1 part by weight of dye A-3 was dissolved in 40 parts of 2,2,3,3-tetrafluoropropanol by volume with stirring at room temperature for 1 hour. The solution was filtered through a 0.2 μm filter. The dye was coated on the grooved surface of a substrate by spin coating to an optical density of 0.73 at 698 nm. It was dried at 80° C. for 15 minutes.

The disc was gold coated with resistive heating as in example 1.

For testing the same method was used as in example 1 with a disk without a lacquer layer. With 13 mW write power 58 dB signal was obtained on reading.

Example 4 with Dye A-4

The same disk substrate was used as in the first example.

To form the light absorptive layer 1 part by weight of dye A-4 was dissolved in 40 parts of 2,2,3,3-tetrafluoropropanol by volume with stirring at room temperature for 1 hour. The solution was filtered through a 0.2 μm filter. The dye was coated on the grooved surface of a substrate by spin coating to an optical density of 0.54 at 698 nm. It was dried at 80° C. for 15 minutes.

The disc was gold coated with resistive heating as in example 1.

For testing the same method was used as in example 1. The disk was tested without a lacquer layer. At 14 mW write power 58 dB CNR was obtained on reading.

Example 5 with Dye A-5

The same disk substrate was used as in the first example.

To form the light absorptive layer 1 part by weight of dye A-5 was dissolved in 40 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 0.56 at 662 nm. It was dried at 80° C. for 15 minutes.

The disc was gold coated by resistive heating as in example 1.

For testing the same method was used as in example 1. The disk was tested without a lacquer layer. At 16 mW write power 51 dB CNR was obtained on reading.

Example 6 with Dye A-6

The same disk substrate was used as in the first example.

To form the light absorptive layer 1 part by weight of dye A-6 was dissolved in 20 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 0.9 at 704 nm. It was dried at 80° C. for 15 minutes.

The disc was gold coated by resistive heating as in example 1.

For testing the same method was used as in example 1. The disk was tested without a lacquer layer. At 12 mW write power 55 dB CNR was obtained on reading.

Example 7 with Dye A-8

The same disk substrate was used as in the first example.

To form the light absorptive layer 1 part by weight of dye A-8 was dissolved in 40 parts of 2,2,3,3-tetrafluoropropanol by volume with stirring at room temperature for 1 hour. The solution was filtered through a 0.2 μm filter. The dye wa coated on the grooved surface of the substrate by spin coating to an optical density of 0.7 at 700 nm. It was dried at 80° C. for 15 minutes.

The disc was gold coated by resistive heating as in example 1.

For testing the same method was used as in example 1. The disk was tested without a lacquer layer. At 12 mW write power 60 dB CNR was obtained on reading.

Example 8 with Dye A-9

The same disk substrate was used as in the first example.

To form the light absorptive layer 1 part by weight of dye A-9 was dissolved in 40 parts of 2,2,3,3-tetrafluoropropanol by volume with stirring at room temperature for 1 hour. The solution was filtered through a 0.2 μ filter. The dye was coated on the grooved surface of the substrate by spin coating to an optical density of 0.95 at 702 nm. It was dried at 80° C. for 15 minutes.

The disc was gold coated by resistive heating as in example 1.

For testing the same method was used as in example 1. The disk was tested without a lacquer layer. At 11 mW write power 58 dB CNR was obtained on reading.

Example 9 with Dye A-10

The same disk substrate was used as in the first example.

To form the light absorptive layer 1 part by weight of dye A-10 was dissolved in 40 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 0.98 at 686 nm. It was dried at 80° C. for 15 minutes.

The disc was gold coated by resistive heating as in example 1.

For testing the same method was used as in example 1. The disk was tested without a lacquer layer. At 14 mW write power 62 dB CNR was obtained on reading.

Example 10 with Dye A-11

The same disk substrate was used as in the first example.

To form the light absorptive layer 1 part by weight of dye A-11 was dissolved in 40 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 0.9 at 676 nm. It was dried at 80° C. for 15 minutes.

The disc was gold coated by resistive heating as in example 1.

For testing the same method was used as in example 1. The disk was tested without a lacquer layer. At 17 mW write power 61 dB CNR was obtained on reading.

Example 11 with Dye A-12

The same disk substrate was used as in the first example.

To form the light absorptive layer 1 part by weight of dye A-12 was dissolved in 40 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 1.0 at 692 nm. It was dried at 80° C. for 15 minutes.

The disc was gold coated by resistive heating as in example 1.

For testing the same method was used as in example 1. The disk was tested without a lacquer layer. At 12 mW write power 53 dB CNR was obtained on reading.

Example 12 Dye A-13

The same disk substrate was used as in the first example.

To form the light absorptive layer 1 part by weight of dye A-13 was dissolved in 40 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 0.6 at 698 nm. It was dried at 80° C. for 15 minutes.

The disc was gold coated by resistive heating as in example 1.

For testing the same method was used as in example 1. The disk was tested without a lacquer layer. At 12 mW write power 60 dB CNR was obtained on reading.

Example 13 with Dye A-14

The same disk substrate was used as in the first example.

To form the light absorptive layer 1 part by weight of dye A-14 was dissolved in 40 parts of 2,2,3,3-tetrafluoropropanol by volume with stirring at room temperature for 1 μm hour. The solution was filtered through a 0.2 μm filter. The dye was coated on the grooved surface of the substrate by spin coating to an optical density of 1.1 at 700 nm. It was dried at 80° C. for 15 minutes.

The disc was gold coated by resistive heating as in example 1.

For testing the same method was used as in example 1. The disk was tested without a lacquer layer. At 14 mW write power 60 BB CNR was obtained on reading.

Example 14 with dye A-15

The same disk substrate was used as in the first example.

To form the light absorptive layer 1 part by weight of dye A-15 was dissolved in 40 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 0.97 at 690 nm. It was dried at 80° C. for 15 minutes.

The disc was gold coated by resistive heating as in example 1.

For testing the same method was used as in example 1. The disk was tested without a lacquer layer. At 15 mW write power 63 dB CNR was obtained on reading.

Example 15 with Dye A-16

The same disk substrate was used as in the first example.

To form the light absorptive layer 1 part by weight of dye A-16 was dissolved in 40 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 0.54 at 706 nm. It was dried at 80° C. for 15 minutes.

The disc was gold coated by resistive heating as in example 1.

For testing the same method was used as in example 1. The disk was tested without a lacquer layer. At 15 mW write power 59 dB CNR was obtained on reading.

Example 16 with Dye A-17

The same disk substrate was used as in the first example.

To form the light absorptive layer 1 part by weight of dye A-17 was dissolved in 40 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 1.1 at 690 nm. It was dried at 80° C. for 15 minutes.

The disc was gold coated by resistive heating as in example 1.

For testing the same method was used as in example 1. The disk was tested without a lacquer layer. At 14 mW write power 62 dB CNR was obtained on reading.

Example 17 Dye C-1

The same disk substrate was used as in the first example.

To form the light absorptive layer 1 part by weight of dye C-1 was dissolved in 40 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 0.9 at 654 nm. It was dried at 80° C. for 15 minutes.

The disc was gold coated by resistive heating as in example 1.

For testing the same method was used as in example 1. The disk was tested without a lacquer layer. At 12 mW write power 60 dB CNR was obtained on reading.

Example 18 Dye D-2

The same disk substrate was used as in the first example.

To form the light absorptive layer, 1 part by weight of dye D-2 was dissolved in 40 parts of 2,2,3,3-tetrafluoropropanol by volume with stirring at room temperature for 1 hour. The solution was filtered through a 0.2 μm filter. The dye was coated on the grooved surface of the substrate by spin coating to an optical density of 0.9 at 700 nm. The disk was dried at 80° C. for 15 minutes.

The disc was gold coated by resistive heating as in example 1.

For testing, the same method was used as in example 1. The disc was tested with and without a lacquer layer. Without a lacquer layer at 14 mW write power, 59 dB CNR was obtained on reading. With a lacquer layer at 14 mW write power, 63 dB CNR was obtained on reading.

Example 19 Light Stability

The dyes indicated in the table below were spin coated on polycarbonate slides about 5 cm square. Optical density measurements were taken 5 mm from the edge on two opposite sides of the slides with a diode array spectrophotometer between 400 nm and 800 nm wave lengths. One measured side of the slide was covered and the slide was exposed through the polycarbonate for sixteen days by a method in accordance with ANSI IT9.9-1990 "Stability of Color Photographic Images" Section 5 paragraph 5.6.

To calculate the percent optical density loss, the optical density after light exposure (AL) was substracted from the optical density before light exposure (BL). (The optical density was measured at the λ-max.) The resulting value was divided by the optical density value before light exposure and multiplied by 100. This calculation was carried out with both the uncovered and covered (CAL) sides of the slides. Then, from the value obtained from the uncovered side, the value from the covered side was subtracted and the resulting value was taken as the percent optical density loss due to light exposure.

$$\% \text{ loss} = \left(\frac{BL - AL}{BL} \times 100\right) - \left(\frac{BL - CAL}{BL} \times 100\right)$$

In this test, a typical cyanine dye such as those described in U.S. Pat. No. 4,940,618, cited above, loses 100%. The results with the dyes useful in the invention are shown in the table below:

Table of Light Stability

| Dye | % Optical Density Loss After 16 days 50 Klux Light Exposure |
|---|---|
| A-1 | 3.5 |
| A-9 | 1.4 |
| A-11 | 8.0 |
| A-13 | 2.9 |
| A-15 | 6.4 |
| A-16 | 8.7 |
| A-17 | 6.4 |

Dark stability also tested for several of the dyes. The test involved incubation at 80° C. and 80% R.H. for six weeks. The results are shown in the Table below:

Table of Dark Stability

| Dye | % Optical Density Loss After 6 Wks 80° C./80% R.H. |
|---|---|
| A-9 | 15.9 |
| A-11 | 10.6 |
| A-13 | 0 |
| A-15 | 4.6 |

The invention has been described with particular reference to preferred embodiments thereof but it will be understood that modifications can be made within the spirit and scope of the invention.

What is claimed is:

1. A recordable optical element comprising a transparent substrate and on the surface of said substrate, a dye containing recording layer and a light reflecting layer, said dye being a metal complex of a tridentate azo dye ligand containing, on one side of the azo linkage, an aminohydroxypyridine group and on the other side, an aromatic ring having an electron withdrawing substituent and a hydroxyl, carboxyl or sulfonamido group.

2. A recordable optical element according to claim 1 wherein said dye has the Structure A:

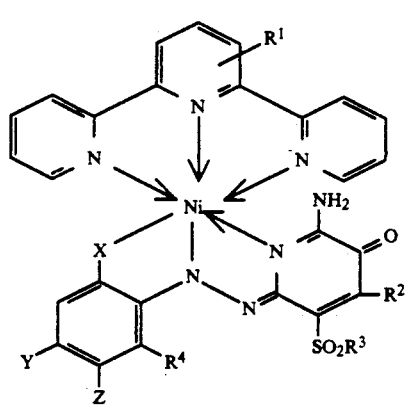
Structure A wherein $R^1$ represents a substituted or unsubstituted alkyl group of from 1 to about 10 carbon atoms; an aryl group of from about 6 to about 10 carbon atoms; a heteroaryl group of from about 5 to about 10 carbon atoms; an acyl group; an alkyl or aryl sulfonyl group; an aminocarbonyl group; an alkylthio group; an arylthio group or alkoxy group containing from 1 to about 15 carbon atoms or an aryloxy group containing from 6 to about 15 carbon atoms;

$R^2$ represents hydrogen or an alkyl group of from 1 to about 6 carbon atoms;

$R^3$ represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or $NR^5R^6$ where $R^5$ and $R^6$ each independently represent hydrogen; an alkyl group of from 1 to about 5 carbon atoms; an aryl group of from about 6 to about 10 carbon atoms; a heteroaryl group of from about 5 to about 10 carbon atoms; or a cycloalkyl group of from about 5 to about 7 carbon atoms; or may be taken together to form a carbocyclic or heterocyclic ring having from about 5 to about 7 atoms;

$R^4$ represents hydrogen; an alkyl group of from 1 to about 4 carbon atoms; or a halogen atom;

X represents oxygen, carboxyl group or $NSO_2R^7$ where $R^7$ is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms.

3. A recordable optical element according to claim 1 wherein said dye has the Structure B:

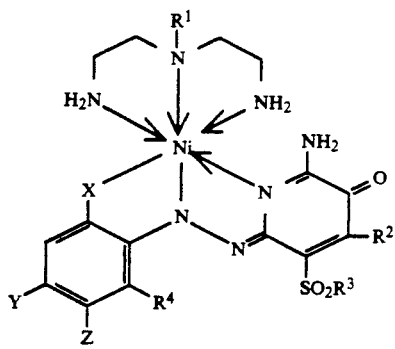

Structure B wherein

R[1] represents a substituted or unsubstituted alkyl group of from 1 to about 10 carbon atoms; an aryl group of from about 6 to about 10 carbon atoms; a heteroaryl group of from about 5 to about 10 carbon atoms; an acyl group; an alkyl or aryl sulfonyl group; an aminocarbonyl group; an alkylthio group; an arylthio group or alkoxy group containing from 1 to about 15 carbon atoms or an aryloxy group containing from 6 to about 15 carbon atoms;

R[2] represents hydrogen or an alkyl group of from 1 to about 6 carbon atoms;

R[3] represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or NR[5]R[6] where R[5] and R[6] each independently represent hydrogen; an alkyl group of from 1 to about 5 carbon atoms; an aryl group of from about 6 to bout 10 carbon atoms; a heteroaryl group of from about 5 to about 10 carbon atom; or a cycloalkyl group of from about 5 to about 7 carbon atoms; or may be taken together to form a carbocyclic or heterocyclic ring having from about 5 to about 7 atoms;

R[4] represents hydrogen; an alkyl group of from 1 to about 4 carbon atoms; or a halogen atom;

X represents oxygen, carboxyl group or NSO$_2$R[7] where R[7] is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms.

4. A recordable optical element according to claim 1 wherein said dye has the Structure C:

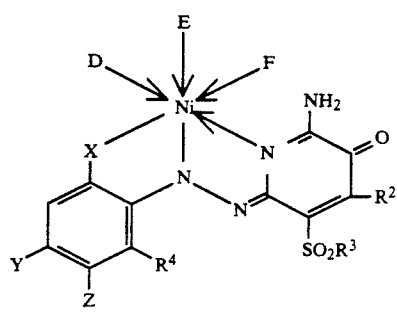

Structure C wherein

D,F and E are complexing agents;

R[2] represents hydrogen or an alkyl group of from 1 to about 6 carbon atoms;

R[3] represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or NR[5]R[6] where R[5] and R[6] each independently represent hydrogen; an alkyl group of from 1 to about 5 carbon atoms; an aryl group of from about 6 to about 10 carbon atoms; a heteroaryl-group of from about 5 to about 10 carbon atoms; or a cycloalkyl group of from about 5 to about 7 carbon atoms; or may be taken together to form a carbocyclic or heterocyclic ring having from about 5 to about 7 atoms;

R[4] represents hydrogen; an alkyl group of from 1 to about 4 carbon atoms; or a halogen atom;

X represents oxygen, carboxyl group or NSO$_2$R[7] were R[7] is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms.

5. A recordable optical element according to claim 1 wherein said dye has the Structure D:

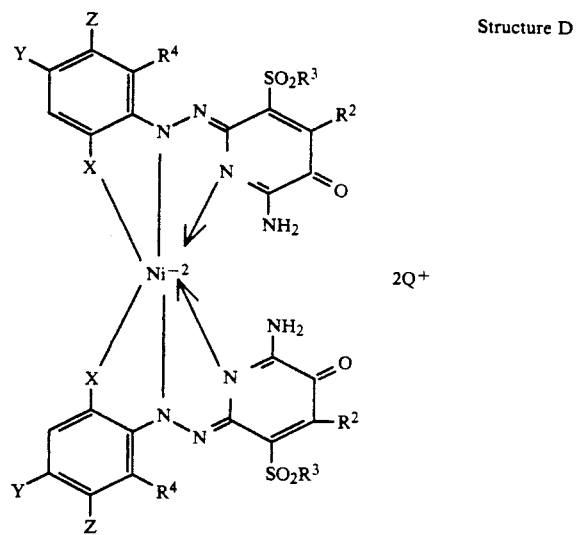

Structure D wherein

R[2] represents hydrogen or an alkyl group of from 1 to about 6 carbon atoms;

R[3] represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or NR[5]R[6] where R[5] and R[6] each independently represent hydrogen; an alkyl group of from 1 to about 5 carbon atoms; an aryl group of from about 6 to about 10 carbon atoms; a heteroaryl group of from about 5 to about 10 carbon atoms; or a cycloalkyl group of from about 5 to about 7 carbon atoms; or may be taken together to form a carbocyclic or heterocyclic ring having from about 5 to about 7 atoms;

R⁴ represents hydrogen; an alkyl group of from 1 to about 4 carbon atoms; or a halogen atom;

X represents oxygen, carboxyl group or NSO₂R⁷ where R⁷ is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms; and Q is a cation.

6. A recordable optical recording element according to claim 1 wherein said dye has the formula:

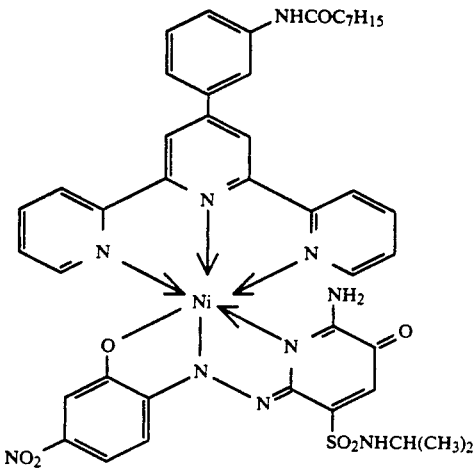

7. A recordable optical element according to claim 1 wherein said dye has the formula

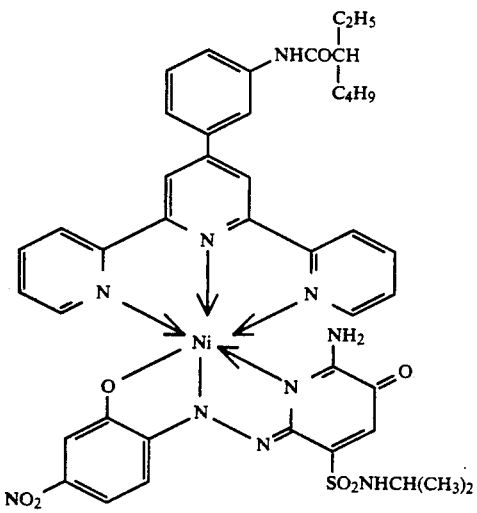

8. A recordable optical element according to claim 1 wherein said dye has the formula:

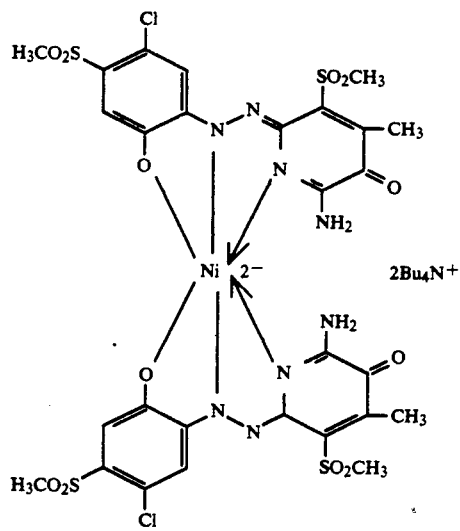

9. A recordable optical element comprising a transparent substrate and on the surface of said substrate, a dye containing recording layer and a light reflecting layer, said dye being a metal complex of a tridentate azo dye ligand containing, on one side of the azo linkage, an aminohydroxypyridine group and on the other side, an aromatic ring having an electron withdrawing substituent and a hydroxyl, carboxyl or sulfonamido group, wherein information is stored on said element in the form of high optical density marks on a reflective background.

10. A recordable optical element according to claim 9, wherein said dye has the Structure A:

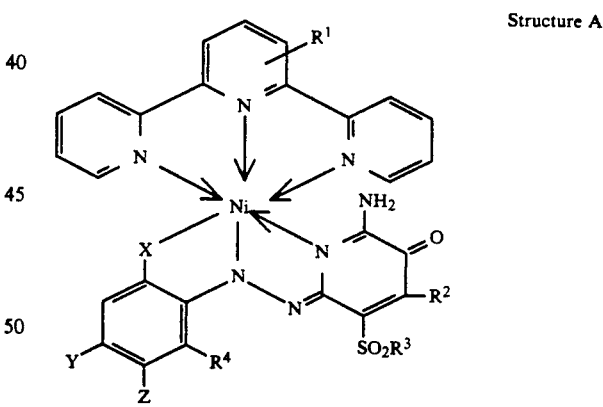

Structure A wherein

R¹ represents a substituted or unsubstituted alkyl group of from 1 to about 10 carbon atoms; an aryl group of from about 6 to about 10 carbon atoms; a heteroaryl group of from about 5 to about 10 carbon atoms; an acyl group; an alkyl or aryl sulfonyl group; an aminocarbonyl group; an alkylthio group; an arylthio group or alkoxy group containing from 1 to about 15 carbon atoms or an aryloxy group containing from 6 to about 15 carbon atoms;

R² represents a hydrogen or an alkyl group of from 1 to about 6 carbon atoms;

R³ represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or $NR^5R^6$ where $R^5$ and $R^6$ each independently represent hydrogen; an alkyl group of from 1 to about 5 carbon atoms; an aryl group of from about 6 to about 10 carbon atoms; a heteroaryl group of from about 5 to about 10 carbon atoms; or a cycloalkyl group of from about 5 to about 7 carbon atoms; or may be taken together to form a carbocyclic or heterocyclic ring having from about 5 to about 7 atoms;

$R^4$ represents hydrogen; an alkyl group of from 1 to about 4 carbon atoms; or a halogen atom;

X represents oxygen, carboxyl group or $NSO_2R^7$ where $R^7$ is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms.

11. A recordable optical element according to claim 9, wherein said dye has the Structure B:

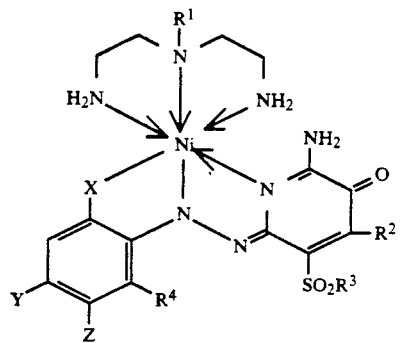

Structure B wherein $R^1$ represents a substituted or unsubstituted alkyl group of from 1 to about 10 carbon atoms; an aryl group of from about 6 to about 10 carbon atoms; a heteroaryl group of from about 5 to about 10 carbon atoms; an acyl group; an alkyl or aryl sulfonyl group; an aminocarbonyl group; an alkylthio group; an arylthio group or alkoxy group containing from 1 to about 15 carbon atoms or an aryloxy group containing from 6 to about 15 carbon atoms;

$R^2$ represents hydrogen or an alkyl group of from 1 to about 6 carbon atoms;

$R^3$ represents an alkyl group of from 1 to about 5 carbon atoms; an aryl group of from about 6 to 10 carbon atoms; a cycloalkyl group of form about 5 to about 7 carbon atoms; a heteroaryl group of from 5 to about 10 carbon atoms; or $NR^5R^6$ where $R^5$ and $R^6$ each independently represent hydrogen; an alkyl group of from 1 to about 5 carbon atoms; an aryl group of from about 6 to about 10 carbon atoms; a heteroaryl group of from about 5 to about 10 carbon atoms; or a cycloalkyl group of from about 5 to about 7 carbon atoms; or may be taken together to form a carbocyclic or heterocyclic ring having from about 5 to about 7 atoms;

$R^4$ represents hydrogen; an alkyl group of from 1 to about 4 carbon atoms; or a halogen atom;

X represents oxygen, carboxyl group or $NSO_2R^7$ where $R^7$ is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms.

12. A recordable optical element according to claim 9, wherein said dye has the Structure C:

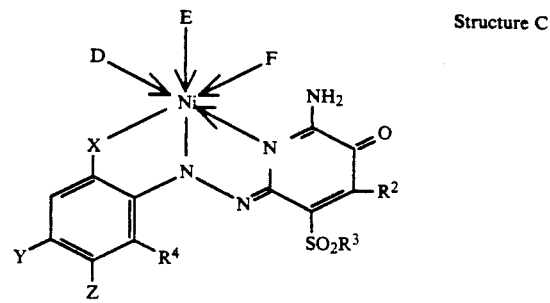

Structure C wherein

D, F and E are complexing agents;

$R^2$ represents hydrogen or an alkyl group of from 1 to about 6 carbon atoms;

$R^3$ represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or $NR^5R^6$ where $R^5$ and $R^6$ each independently represent hydrogen; an alkyl group of from 1 to about 5 carbon atoms; an aryl group of from about 6 to about 10 carbon atoms; a heteroaryl group of from about 5 to about 10 carbon atoms; or a cycloalkyl group of from about 5 to about 7 carbon atoms; or may be taken together to form a carbocyclic or heterocyclic ring having from about 5 to about 7 atoms;

$R^4$ represents hydrogen; an alkyl group of from 1 to about 4 carbon atoms; or a halogen atom;

X represents oxygen, carboxyl group or $NSO_2R^7$ where $R^7$ is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms.

13. A recordable optical element according to claim 9, wherein said dye has the Structure D:

Structure D

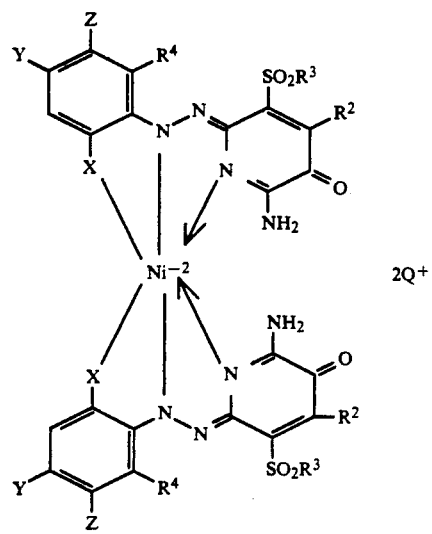

wherein

R[2] represents hydrogen or an alkyl group of from 1 to about 6 carbon atoms;

R[3] represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or NR[5]R[6] where R[5] and R[6] each independently represent hydrogen; an alkyl group of from 1 to about 5 carbon atoms; an aryl group of from about 6 to about 10 carbon atoms; a heteroaryl group of from about 5 to about 10 carbon atoms; or a cycloalkyl group of from about 5 to about 7 carbon atoms; or may be taken together to form a carbocyclic or heterocyclic ring having from about 5 to about 7 atoms;

R[4] represents hydrogen; an alkyl group of from 1 to about 4 carbon atoms; or a halogen atom;

X represents oxygen, carboxyl group or NSO$_2$R[7] where R[7] is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms; and Q is a cation.

14. A recordable optical element according to claim 9, wherein said dye is selected from the group consisting of the following formulas:

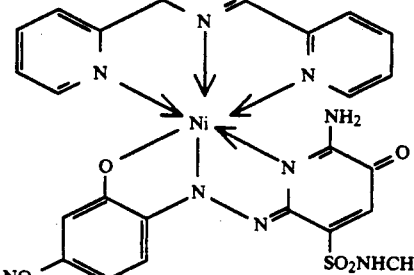
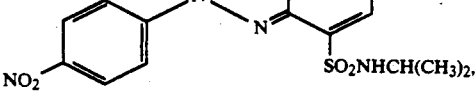
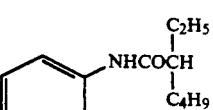
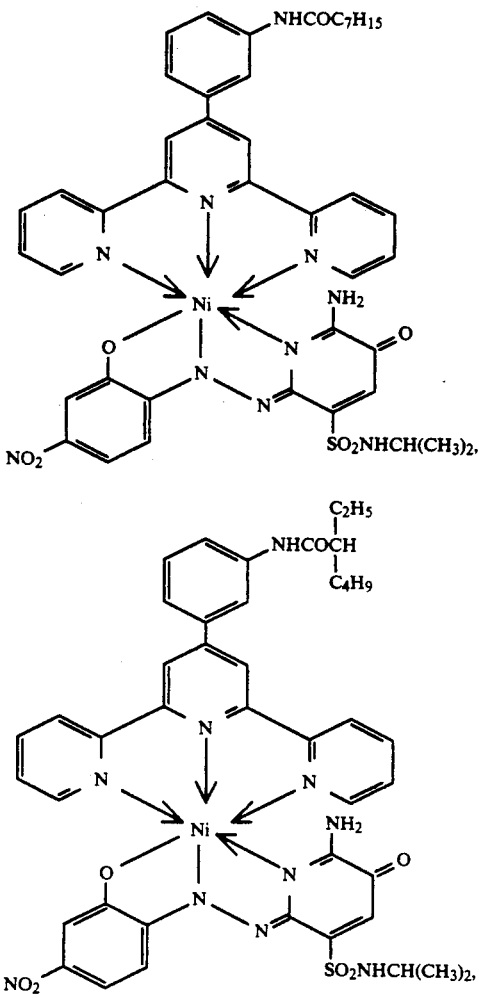

and

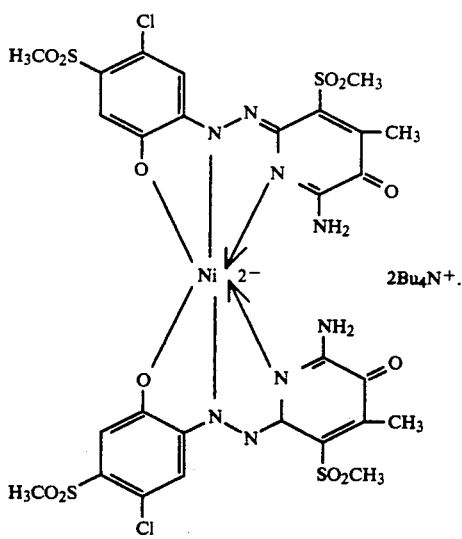

15. A recordable optical element according to claim 9, wherein said stored information is readable by a light source with a wavelength between 770 nm and 800 nm.

16. A recordable optical element comprising a transparent substrate and on the surface of said substrate, a dye containing recording layer and a light reflecting layer, said dye being a metal complex of a tridentate azo dye ligand containing, on one side of the azo linkage, an aminohydroxypyridine group and on the other side, an aromatic ring having an electron withdrawing substituent and a hydroxyl, carboxyl or sulfonamido group, wherein the real part of the complex refractive index of said dye containing recording layer when unwritten measured with a 780 nm light source is not less than 1.8 and the imaginary part is not greater than 0.15.

17. A recordable optical element according to claim 16, wherein said dye has the Structure A:

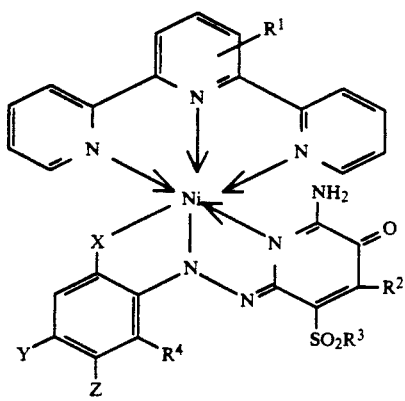

Structure A wherein $R^1$ represents a substituted or unsubstituted alkyl group of from 1 to about 10 carbon atoms; an aryl group of from about 6 to about 10 carbon atoms; a heteroaryl group of from about 5 to about 10 carbon atoms; an acyl group; an alkyl or aryl sulfonyl group; an aminocarbonyl group; an alkylthio group; an arylthio group or alkoxy group containing from 1 to about 15 carbon atoms or an aryloxy group containing from 6 to about 15 carbon atoms;

$R^2$ represents hydrogen or an alkyl group of from 1 to about 6 carbon atoms;

$R^3$ represents an alkyl group of from 1 to about 5 carbon atoms; an aryl group of from about 6 to 10 carbon atoms; a cycloalkyl group of from about 5 to about 7 carbon atom; a heteroaryl group of from 5 to about 10 carbon atoms; or $NR^5R^6$ where $R^5$ and $R^6$ each independently represent hydrogen; an alkyl group of from 1 to about 5 carbon atoms; an aryl group of from about 6 to about 10 carbon atoms; a heteroaryl group of from about 5 to about 10 carbon atoms; or a cycloalkyl group of from about 5 to about 7 carbon atoms; or may be taken together to form a carbocyclic or heterocyclic ring having from about 5 to about 7 atoms;

$R^4$ represents hydrogen; an alkyl group of from 1 to about 4 carbon atoms; or a halogen atom;

X represents oxygen, carboxyl group or $NSO_2R^7$ where $R^7$ is an alkyl group of from 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms.

18. A recordable optical element according to claim 16, wherein said dye has the Structure B:

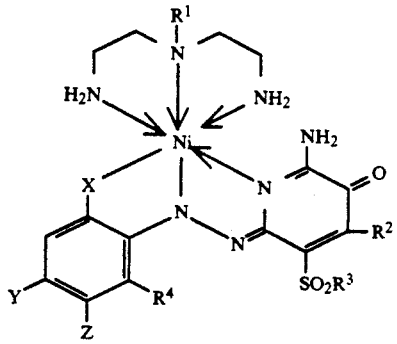

Structure B wherein $R^1$ represents a substituted or unsubstituted alkyl group of from 1 to about 10 carbon atoms; an aryl group of form about 6 to about 10 carbon atoms; a heteroaryl group of from about 5 to about 10 carbon atoms; an acyl group; an alkyl or aryl sulfonyl group; an aminocarbonyl group; an alkylthio group; an arylthio group or alkoxy group containing from 1 to about 15 carbon atoms or an aryloxy group containing from 6 to about 15 carbon atoms;

$R^2$ represents hydrogen or an alkyl group of from 1 to about 6 carbon atoms;

$R^3$ represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or $NR^5R^6$ where $R^5$ and $R^6$ each independently represent hydrogen; an alkyl group of from 1 to about 5 carbon atoms; an aryl group of from about 6 to about 10 carbon atoms; a heteroaryl group of from about 5 to about 10 carbon atoms; or a cycloalkyl group of from about 5 to about 7 carbon atoms; or may be taken together to form a carbocyclic or heterocyclic ring having from about 5 to about 7 atoms;

$R^4$ represents hydrogen; an alkyl group of from 1 to about 4 carbon atoms; or a halogen atom;

X represents oxygen, carboxyl group or $NSO_2R^7$ where $R^7$ is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms.

19. A recordable optical element according to claim 16, wherein said dye has the Structure C:

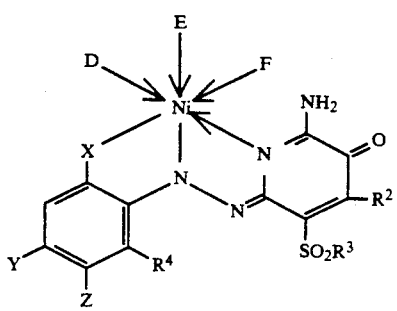

Structure C wherein

D, F and E are complexing agents;

$R^2$ represents hydrogen or an alkyl group of from 1 to about 6 carbon atoms;

$R^3$ represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or $NR^5R^6$ where $R^5$ and $R^6$ each independently represent hydrogen; an alkyl group of from 1 to about 5 carbon atoms; an aryl group of from about 6 to about 10 carbon atoms; a heteroaryl group of from about 5 to about 10 carbon atoms; or a cycloalkyl group of from about 5 to about 7 carbon atoms; or may be taken together to form a carbocyclic or heterocyclic ring having from about 5 to about 7 atoms;

$R^4$ represents hydrogen; an alkyl group of from 1 to about 4 carbon atoms; or a halogen atom;

X represents oxygen, carboxyl group or $NSO_2R^7$ where $R^7$ is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents a cyano, a halogen, an alkyl, or an alkoxy group of from 1 to about 10 carbon atoms.

20. A recordable optical element according to claim 16, wherein said dye has the Structure D:

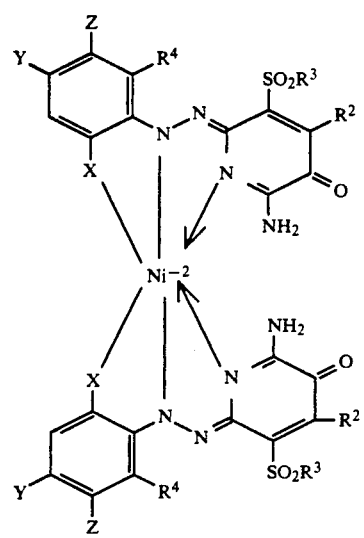

Structure D wherein $R^2$ represents hydrogen or an alkyl group of from 1 to about 6 carbon atoms;

$R^3$ represents an alkyl group of from 1 to about 5 carbon atoms; an aryl group of from about 6 to 10 carbon atoms; a cycloalkyl group of from about 5 to about 7 carbon atoms; a heteroaryl group of from 5 to about 10 carbon atoms; or $NR^5R^6$ where $R^5$ and $R^6$ each independently represent hydrogen; an alkyl group of from 1 to about 5 carbon atoms; an aryl group of from about 6 to about 10 carbon atoms; or a cycloalkyl group of from about 5 to about 7 carbon atoms; or may be taken together to form a carbocyclic or heterocyclic ring having form about 5 to about 7 atoms;

$R^4$ represents hydrogen; an alkyl group of from 1 to about 4 carbon atoms; or a halogen atom;

X represents oxygen, carboxyl group or $NSO_2R^7$ where $R^7$ is an alkyl group of from 1 to about 4 carbon atoms; an aryl group of from about 6 to 10 carbon atoms or a hetaryl group of from about 5 to about 10 carbon atoms;

Y represents an electron withdrawing group; and

Z represents cyano, a halogen, an alkyl, or an alkoxy group of from 1 to about 10 carbon atoms; and Q is a cation.

21. A recordable optical element according to claim 16, wherein said dye is selected from the group consisting of the following formulas:

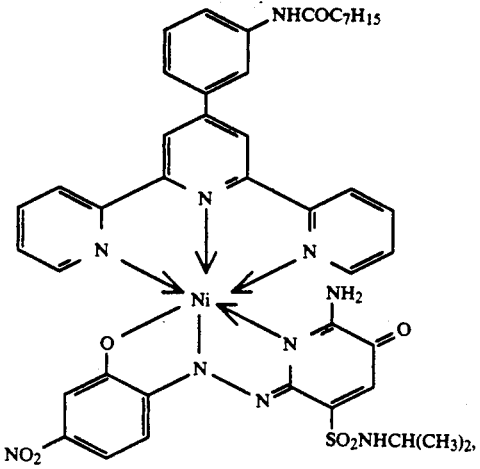

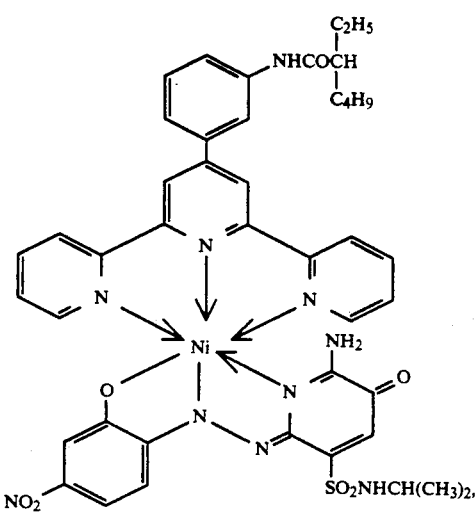

and

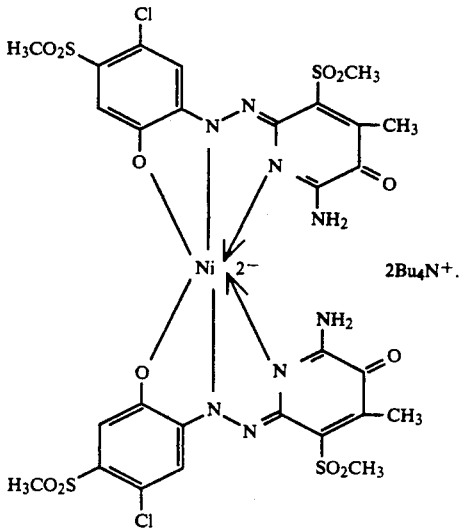

* * * * *